United States Patent [19]
Khadkikar et al.

[11] Patent Number: 6,085,588
[45] Date of Patent: Jul. 11, 2000

[54] FLOW RATE SENSOR

[75] Inventors: Prasad S. Khadkikar, Seville; Eric B. Caudill, Mansfield, both of Ohio

[73] Assignee: Therm-O-Disc, Incorporated, Mansfield, Ohio

[21] Appl. No.: 09/076,852

[22] Filed: May 12, 1998

[51] Int. Cl.[7] ........................................... G01F 1/68
[52] U.S. Cl. ........................... 73/204.27; 73/204.23; 73/204.25
[58] Field of Search .............. 73/861.52, 861.63, 73/204.22, 204.23, 204.24, 204.25, 204.26, 204.27; 374/10

[56] References Cited

U.S. PATENT DOCUMENTS

| | | |
|---|---|---|
| 3,335,606 | 8/1967 | Scarpa . |
| 3,374,673 | 3/1968 | Trageser . |
| 3,623,364 | 11/1971 | Withrow . |
| 3,992,940 | 11/1976 | Platzer, Jr. . |
| 4,028,689 | 6/1977 | Schopp . |
| 4,074,573 | 2/1978 | Nordhofen ............................ 73/861.52 |
| 4,135,396 | 1/1979 | Stanke et al. ............................ 73/204 |
| 4,357,936 | 11/1982 | Ellestad et al. . |
| 4,384,578 | 5/1983 | Winkler . |
| 4,428,088 | 1/1984 | Getz et al. . |
| 4,480,467 | 11/1984 | Harter et al. ............................ 73/204 |
| 4,501,144 | 2/1985 | Higashi et al. ............................ 73/204 |
| 4,528,709 | 7/1985 | Getz et al. . |
| 4,576,043 | 3/1986 | Nguyen ............................ 73/861.52 |
| 4,648,271 | 3/1987 | Woolf ............................ 73/204 |
| 4,884,460 | 12/1989 | Nowacki et al. ............................ 73/861.52 |
| 5,119,674 | 6/1992 | Nielsen ............................ 73/204.24 |
| 5,142,907 | 9/1992 | Hinkle ............................ 73/204.12 |
| 5,216,918 | 6/1993 | Landis et al. ............................ 73/204.19 |
| 5,582,628 | 12/1996 | Wood ............................ 73/204.18 |
| 5,691,914 | 11/1997 | Randoph ............................ 73/861.52 |
| 5,783,757 | 7/1998 | Le Van Suu ............................ 73/204.27 |

*Primary Examiner*—William Oen
*Attorney, Agent, or Firm*—Harness, Dickey & Pierce, P.L.C.

[57] ABSTRACT

A flow rate sensor includes a substantially cylindrical sensor body having an inlet end and an outlet end, and a flow channel formed between the two ends of the sensor through which a liquid can flow, an ambient temperature sensing device, and a heated temperature sensing device, wherein the flow rate of the liquid in the flow channel can be calculated by measuring the temperature drop of the heated temperature sensing device. The sensor may also include: a flow equalizer for generating a known flow profile across the ambient temperature sensing device; a constrictor, located near the heated temperature sensing device, for improving the response and consistency of the measurement of the heated device; electronic circuitry for measuring the voltage readings from the ambient temperature device and the heated temperature device; and an MCU, which may be a standalone component, or which may be part of a household appliance such as a washing machine, for converting the measurements from the electronic circuitry to a flow rate. The sensor can be used alone, or in combination with other sensors to provide for a "smart" appliance.

35 Claims, 3 Drawing Sheets

FLOW RATE SENSOR

BACKGROUND OF THE INVENTION

The present invention is directed to an improved flow rate sensor. In particular, the flow rate sensor disclosed is optimized for use with high flow rate liquid applications, such as a household appliance like a washing machine or dishwasher, which typically consume water at a rate of several gallons per minute. The sensor could be used with any other application where it is desirable to quickly and reliably measure flow rate.

Recently, a great deal of concern has developed regarding environmentally-friendly appliances. Such appliances use less electricity and only the minimum necessary amount of water to accomplish the designated task, such as washing clothes. An example of this concern is demonstrated by the EPA's "Energy Star" program, which sets requirements for power consumption in the home electronics area and designates certain appliances as "Energy Star" compliant when they meet those requirements.

The present invention is also aimed at making appliances more environmentally friendly, but in the area of water consumption. By integrating the flow rate sensor described in this application with a washing machine (or other appliance) having a minimum level of intelligence, a "smart" appliance is possible. Such a "smart" machine includes some type of computer controller, such as a microprocessor or microcontroller ("MCU"), which is coupled to a variety of sensors. The flow rate sensor of the present invention could be one of those sensors. Other sensors may include temperature sensors, level sensors, humidity sensors, optical sensors, etc. The flow rate sensor of the present invention can be used alone, or in combination with other sensors, to provide the "smart" appliance with precise information regarding the amount of water being consumed. In this manner, and under computer-implemented software instructions operating at the MCU, the water consumption of the appliance can be made optimally efficient depending upon the size of the load, water temperature, and any other conditions.

Presently known flow rate sensors include: (1) "turbine-type", including paddle wheels or hinged vanes; (2) pressure gradient sensors; (3) vortex-type sensors; (4) ultra-sonic sensors; and (5) thermal transport sensors. Sensor types (1) through (4) suffer from several disadvantages that make them undesirable for use with household appliances that consume a large amount of water, such as: (i) low accuracy over a wide range of flow rates and inlet temperatures; (ii) low reliability due to moving parts; (iii) more complex signal conditioning and power circuitry; (iv) large size; (v) expensive; and (vi) slow and unstable readings at high flow rates, to name but a few.

Another type of presently known flow rate sensor uses a concept known as "thermal transport." Known thermal transport sensors include at least two temperature measuring devices located at two positions within the sensor, an upstream and a downstream temperature measuring device. The upstream temperature measuring device provides a reading of ambient flow temperature. The downstream device is in close proximity to a heating element that maintains the temperature of the downstream temperature measuring device at the measured ambient level. As liquid flows past the downstream temperature measuring device it is cooled, and thus more energy must be applied to the heating element to maintain it at the ambient level. The flow rate of the liquid is calculated from a measurement of the energy input to the heating element in order to maintain the downstream temperature measuring device at the ambient temperature level. Examples of this type of thermal transport sensor are set forth in U.S. Pat. Nos. 4,480,467 and 4,384,578.

This type of thermal transport sensor suffers from several disadvantages, including: (1) relatively slow response time and unstable readings, particularly for high flow rate applications; (2) more complex electronic circuitry is required to monitor energy consumption; (3) cost; (4) complexity; (5) low sensitivity; (6) inability to operate over a wide range of flow temperatures; and (7) erratic readings due to turbulent flows, to name a few.

Therefore, there remains a need in this art for a low cost flow rate sensor that provide fast response times and stable readings under a variety of conditions, including a wide range of flow temperatures and flow velocities.

There remains a more particular need for such a sensor that provides fasts stable readings at relatively high flow rates, such as are associated with household appliances.

There remains still a more particular need for such a sensor that can be used in conjunction with a household appliance, such as a washing machine or dishwasher, to provide an environmentally optimized "smart" appliance.

SUMMARY OF THE INVENTION

The present invention overcomes the problems noted above and satisfies the needs in this field for a low cost flow rate sensor that provides fast, stable readings under a variety of conditions. The inventive flow rate sensor of the present application uses a variation of the "thermal transport" concept noted in the Background section of this application, which makes the sensor particularly well suited for high flow rate applications.

According to the thermal transport concept of the present invention, two temperature measuring devices are provided with the sensor, one upstream and one downstream. The downstream device is in close proximity to a heating element, as in the presently known thermal transport technique. However, unlike the presently known technique, the downstream device in the present invention is not maintained at the measured ambient temperature level but, instead, is heated by a constant amount of energy that corresponds to a particular delta-temperature higher than the ambient level. Then, as water flows by the heated temperature measuring device, the temperature measured by this device drops. The drop in temperature of the heated temperature measuring device, as referenced to the ambient temperature measured by the upstream temperature measurement device, can be correlated to a flow rate for the liquid according to a known equation.

The flow rate sensor of the present invention includes a substantially cylindrical sensor body having an inlet end and an outlet end, and a flow channel formed between the two ends of the sensor through which a liquid can flow, an ambient temperature sensing device, and a heated temperature sensing device, wherein the flow rate of the liquid in the flow channel can be calculated by measuring the temperature drop of the heated temperature sensing device. The sensor may also include: a flow equalizer for generating a known flow profile across the ambient temperature sensing device; a constrictor, located near the heated temperature sensing device, for improving the response and consistency of the measurement of the heated device; electronic circuitry for measuring the voltage readings from the ambient temperature device and the heated temperature device; and an MCU, which may be a standalone component, or which may be part of a household appliance such as a washing machine, for converting the measurements from the electronic circuitry to a flow rate.

The ambient temperature sensing device of the present invention may include: a thermistor; a substantially cylindrical copper heat sink; and a wire that attaches the thermistor to the heat sink using a winding technique. The heated temperature sensing device may include: a thermistor; a resistive heater, and a wire that attaches the thermistor to the heater, and which may further comprise a probe that extends into the flow channel. Other configurations of the upstream and downstream temperature sensing devices are possible.

The present invention has many advantages over presently known flow rate sensors, including: (1) it provides fast and stable readings at relatively high flow rates; (2) it provides for better response times over a wider range of ambient flow temperatures; (3) low cost; (4) ease of manufacture; (5) small size; and (6) milli-volt outputs that are easily integrated with an MCU. In the context of a "smart" washing machine, which is just one application of the flow sensor described in this application, additional advantages include: (i) energy conservation; (ii) integration with other sensors; and (iii) the ambient temperature sensor can serve as a water temperature sensor, thereby eliminating the need for such an additional sensor.

These are just a few of the many advantages of the resent invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE DRAWINGS

Figure 1:
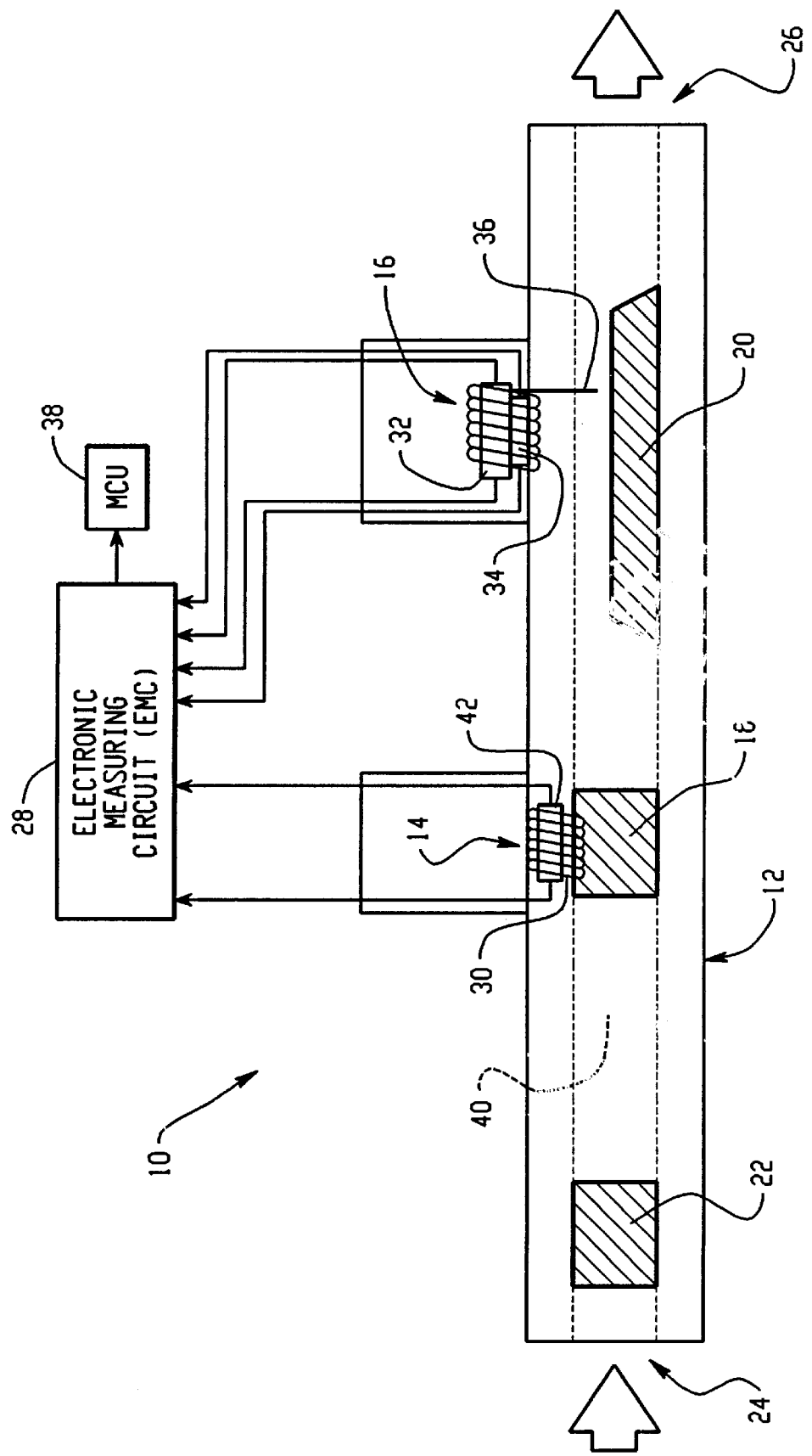
FIG. 1 is diagram of a preferred embodiment of the flow rate sensor of the present invention.

Referring now to the drawings, FIG. 1 sets forth a diagram of a preferred embodiment of the flow rate sensor 10 according to the present invention. The flow rate sensor 10 includes a substantially cylindrical sensor body 12, a flow channel 40 formed within the sensor body 12, an upstream ambient temperature measuring device 14, and a downstream heated temperature measuring device 16. The sensor may also include a flow equalizer 22, a constrictor 20, an electronic measurement circuit ("EMC") 28 (See, FIG. 3) for providing measurements of the temperatures of the ambient temperature sensing device and the heated temperature sensing device, and an MCU 38 for converting the measurements from the EMC 28 into a flow rate.

The sensor body 12 has an inlet end 24, and an outlet end 26, that may be standard screw-type attachments, or any other type of mechanical attachment, for attaching the sensor in-line to a household appliance, such as a washing machine or a dishwasher. The flow channel 40 is formed between the inlet end 24 and the outlet end 26 and thus forms a path for the liquid to flow through while its flow rate is being measured.

Figure 2:
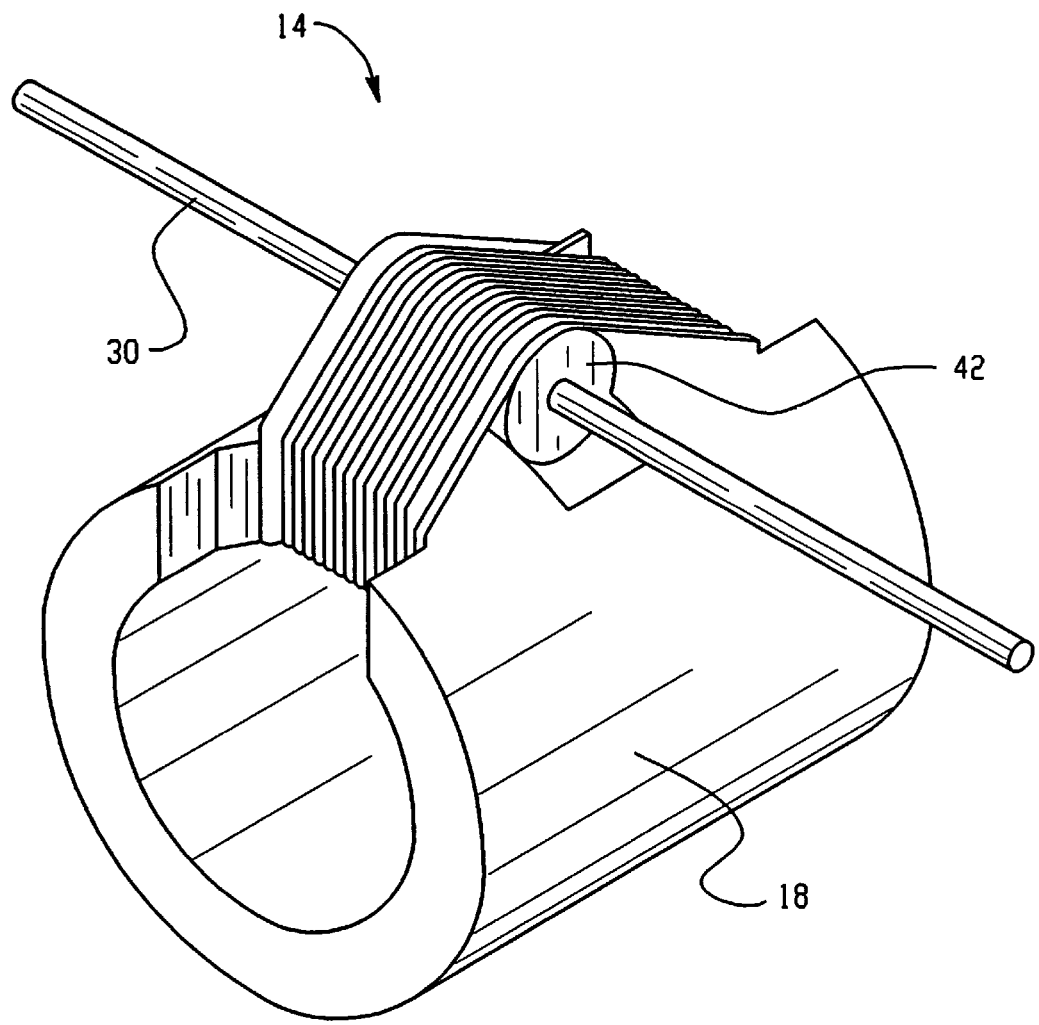
FIG. 2 is a schematic of a preferred embodiment of the ambient temperature sensing device of the present invention.

The ambient temperature measurement device 14, which is shown in more detail in FIG. 2, may include a thermistor 42 as the temperature sensor, although any other type of temperature sensor could be substituted for the thermistor, a heat sink 18 for stabilizing the ambient temperature measurement, and a wire 30 for attaching the thermistor 42 to the heat sink 30. The heated temperature sensing device 16 may include a thermistor 34 as the temperature sensor, although any other type of temperature sensor could be substituted for the thermistor, a resistive heater 32, or any other type of heating element, and a wire 36 that attaches the thermistor 34 to the heating element 32, and which may also form a probe that extends into the flow channel 40. Alternatively, it is also possible to use a "self-heated" temperature sensor, i.e., a thermistor without an external heater.

The sensor body 12 is preferably a substantially cylindrical tube having an inlet end 24 and an outlet end, and having an inner diameter that forms a flow channel 40 through which a liquid to be measured may flow. The sensor body 12 is preferably made of plastic, and may or may not be transparent, although, alternatively, the sensor body could be made of other materials. The flow equalizer 22, heat sink 18, constrictor 20, and wire probe 36 are preferably located within the flow channel 40 of the sensor body 12. The inlet end 24 of the sensor body 12 is characterized as the "upstream" end of the sensor, and the outlet end 26 of the sensor body 12 is characterized as the "downstream" end of the sensor.

The flow equalizer 22 is preferably a substantially cylindrical Teflon piece that press fits within the flow channel 40 of the sensor body 12. Drilled into the flow equalizer are a plurality of flow holes (or channels) that connect the upstream side of the flow equalizer to the downstream side so that liquid can readily pass through it. The flow holes are preferably made of different diameters and are arranged in a particular pattern to ensure a particular flow profile at the downstream side of the flow equalizer 22. The purpose of this device 22 is to prevent turbulent flow within the flow channel 40 and instead to provide a flow that is characterized by a particular profile that results in a more stable measure of ambient temperature by the upstream ambient temperature sensing device 14.

The ambient temperature sensor 14 preferably includes a thermistor 42, a heat sink 18, which is preferably made of copper, and an attachment wire 30. FIG. 2 sets forth a schematic showing this sensor in more detail. As can be seen in FIG. 2, the copper heat sink 18 is a substantially cylindrical piece that is designed to press fit within the flow channel 40 of the sensor body 12. The heat sink 18 is cast so that the thermistor 42 sits within a cut-out section of the heat sink 18, and can be easily attached to it using the attachment wire 30. The purpose of the attachment wire 30 is to mechanically and thermally connect the thermistor 42 to the heat sink 18. Although a thermistor 42 is the preferred ambient temperature sensing element, alternatively other types of temperature sensors could be used with the present invention, such as thermocouples, RTDs, metal wire, etc. The purpose of the copper heat sink 18 is to provide a more stable ambient temperature reading, and to improve the response time of the entire flow rate sensor 10. This purpose is carried out by the heat sink 18 absorbing average heat energy, and carrying it more quickly to the thermistor 42, than if the heat sink 18 were not used.

As shown in FIG. 2, the downstream thermistor 42 is preferably attached to the copper heat sink 18 using a wire 30 and by wrapping the wire about the thermistor 42 and a cut out portion of the heat sink 18. Alternatively, the thermistor 42 could be attached to the heat sink 18 using numerous other mechanical techniques that ensure an intimate thermal contact.

The heated temperature sensing device 16 preferably includes a thermistor 34, resistor heater 32, and a copper attachment wire 36 that connects the thermistor 34 to the heater 32, and which also may form a probe that extends into the flow channel 40. As with the ambient temperature sensing device 14, the thermistor 34 could, alternatively be any other type of temperature measuring device. The heater 32 is preferably a 100 ohm, ¼ watt resistor, but could, alternatively be any other type of heating element, such as other types of resistors, a bare wire, etc. The purpose of the wire probe 36 is to improve the response rate of the heated temperature sensing device 16.

The constrictor 20 is preferably a substantially cylindrical piece of Teflon with a hole drilled off center so that it can be easily inserted into the flow channel 40 of the sensor body 12. The constrictor is preferably positioned just under the probe 36 of the heated temperature sensing device 16. The constrictor improves the response and consistency of the reading from the heated temperature sensing device 16, and also provides a damping effect so as to minimize fluctuations in the reading from the downstream thermistor 34.

The flow sensor of the present invention operates as follows. Incoming liquid (such as water) enters the inlet side 24 of the sensor body 12 into the flow channel 40 and passes through the flow equalizer 22, which ensures that a well defined flow profile will emerge at the downstream end of the equalizer 22. This liquid then passes by and comes into contact with the heat sink 18 of the ambient temperature sensing device 14. The thermal contact between the liquid and the heat sink 18 enables the upstream thermistor 42 to make a fast and stable measurement of the ambient temperature of the liquid in the flow channel 40. The thermistor 42 is connected to the EMC 28, which measures the voltage developed across the thermistor 42. This voltage correlates to a particular ambient temperature reading.

Knowing this ambient temperature value, the EMC 28 applies a certain amount of power to the heating element 32 of the heated temperature sensing device 16 in order to raise the temperature of the downstream thermistor 34 by a particular amount. As the liquid emerges from the heat sink 18 it encounters the constrictor device 20, which essentially restricts the diameter of the flow channel 40, thereby causing the flow profile to become more uniform and minimizing the effects of fluid temperature variations. As this more uniform flow of liquid passes by the wire probe 36 of the heated temperature measuring device 16, the probe is cooled, thereby cooling the downstream thermistor 34, which is in mechanical and thermal contact with the probe 36. The amount of cooling of the downstream thermistor is measured by the EMC 28, and then supplied to the MCU 38 for conversion to a particular flow rate. The liquid then exits the flow channel 40 via the outlet end of the sensor body 12, on its way to the appliance or other device that is associated with the flow rate sensor.

Figure 3:
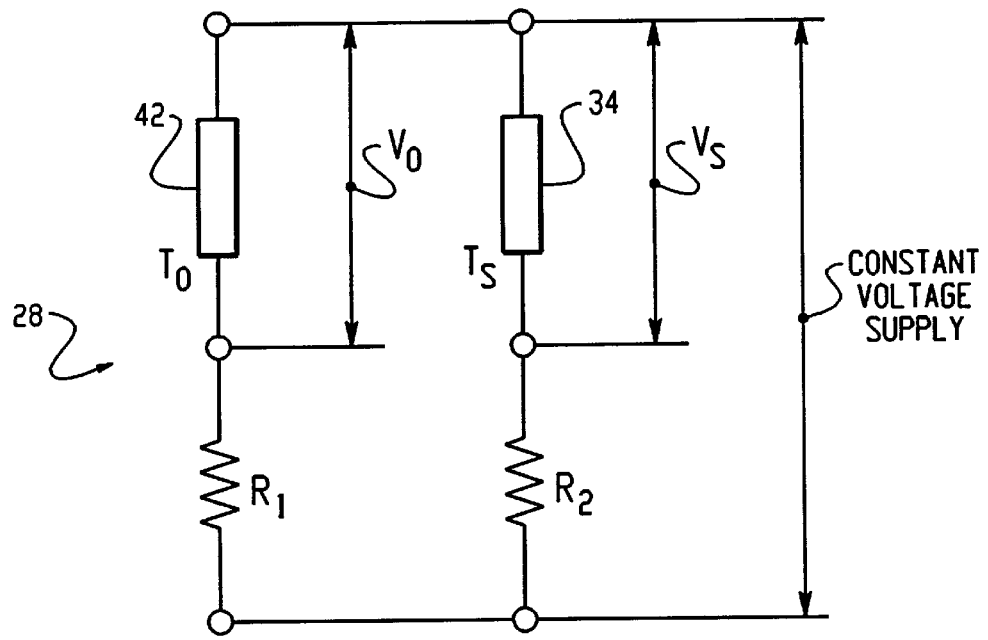
FIG. 3 is an exemplary electronic bridge circuit for providing measurements of the temperatures of the ambient temperature sensing device and the heated temperature sensing device.

FIG. 3 sets forth an exemplary EMC 28 including an electronic bridge circuit for measuring the temperature from the upstream and downstream thermistors. (Not shown in this figure, but within the knowledge of one of ordinary skill in this art, is the circuitry for applying power to the heating element 32). The bridge circuit consists of the two thermistors 34 and 42, and two resistors R1 and R2. A constant excitation voltage is applied across the bridge circuit, and the voltage variation across the thermistor sensors is measured as Vo and Vs, Vo being the voltage across the ambient temperature sensor 42, and Vs being the voltage across the heated temperature sensor 34.

Figure 4:
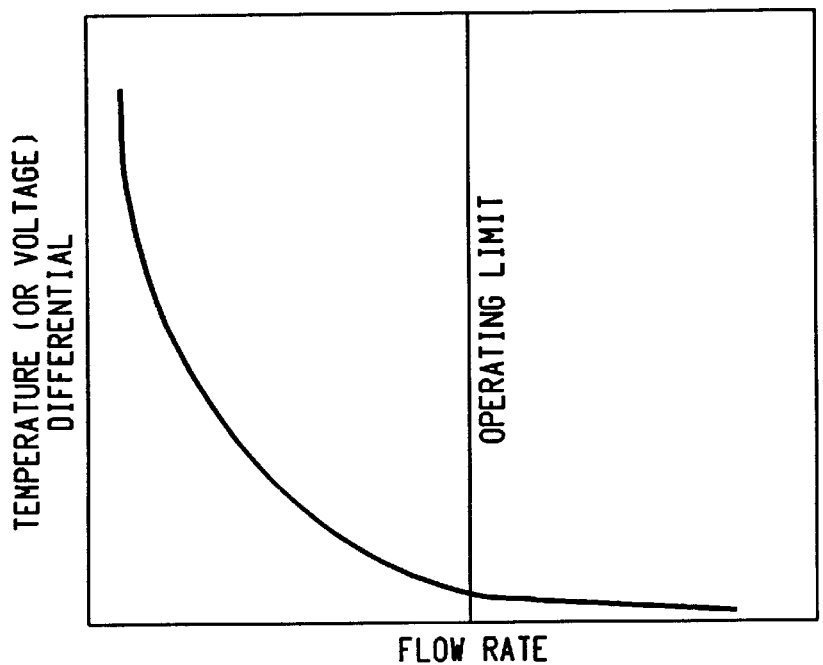
FIG. 4 is an ideal plot of the calculated flow rate versus the temperature differential across the ambient and heated temperature sensing devices of the present invention.

As shown in FIG. 4, the measured difference between Vs and Vo can be correlated to temperature readings knowing the characteristics of the thermistors, and these temperature readings can then be used to calculate a flow rate using an equation known as King's law. King's law permits the calculation of flow rate from two temperature measurements according to the following equation:

$$v = \frac{K}{\rho}\left(\frac{dQ}{dt}\frac{1}{T_s - T_o}\right)^{1.87}$$

Where $\upsilon$ is the flow velocity, K is a calibration constant, $\rho$ is the liquid density, dQ/dt represents thermal loss, Ts is the temperature from the heated temperature sensing device 16, and To is the temperature from the ambient temperature sensing device 14. The exponent value 1.87 could, alternatively be another constant value depending upon the implementation of the sensor device. This calculation is preferably carried out by the MCU 38 under computer software control, and can then be used in conjunction with a "smart" appliance to optimize the amount of water needed for a particular task. In this manner, the present invention provides for an environmentally efficient appliance.

Having described in detail the preferred embodiment of the present invention, including its preferred modes of operation, it is to be understood that this operation could be carried out with different elements and steps. This preferred embodiment is presented only by way of example and is not meant to limit the scope of the present invention which is defined by the following claims.

What is claimed:

1. A flow rate sensor comprising:
   a sensor body having an inlet end and an outlet end and having a flow channel formed between the inlet and outlet ends through which a liquid can flow;
   an ambient temperature sensing device located near the inlet end of the sensor body, the ambient temperature sensing device including a temperature sensor and a heat sink, said heat sink being operative to provide good thermal conductivity between said liquid and said ambient temperature sensing device; and
   a heated temperature sensing device located near the outlet end of the sensor body, wherein the temperature difference between the heated temperature sensing device and the ambient temperature sensing device correlates to a particular flow rate of the liquid passing through the flow channel.

2. The flow rate sensor of claim 1, wherein the sensor body is a substantially cylindrical tube.

3. The flow rate sensor of claim 1, wherein the sensor body is made of plastic.

4. The flow rate sensor of claim 3, wherein the sensor body is made of clear plastic.

5. The flow rate sensor of claim 1, further comprising:
a flow equalizer.

6. The flow rate sensor of claim 1, further comprising:
a constrictor.

7. The flow rate sensor of claim 1, further comprising:
an electronic measurement circuit coupled to the ambient temperature sensing device and the heated temperature sensing device for measuring the temperature of the temperature sensing devices.

8. The flow rate sensor of claim 7, wherein the electronic measurement circuit is a bridge circuit.

9. The flow rate sensor of claim 7, further comprising:
an MCU for converting the measured temperatures into a flow rate.

10. The flow rate sensor of claim 9, wherein the MCU converts the measured temperatures into a flow rate using King's Law.

11. The flow rate sensor of claim 9, wherein the MCU is part of a household appliance.

12. The flow rate sensor of claim 11, wherein the household appliance is a washing machine.

13. The flow rate sensor of claim 1, wherein the ambient temperature sensing device comprises a thermistor.

14. The flow rate sensor of claim 1, wherein the temperature sensor comprises:
a thermistor.

15. The flow rate sensor of claim 14, wherein the ambient temperature sensing device further comprises a wire for attaching the thermistor to the heat sink.

16. The flow rate sensor of claim 1, wherein the heat sink is made of copper.

17. The flow rate sensor of claim 1, wherein the heat sink is a substantially cylindrical metal tube that is within the flow channel.

18. The flow rate sensor of claim 1, wherein the heated temperature sensing device comprises a thermistor.

19. The flow rate sensor of claim 1, wherein the heated temperature sensing device comprises:
a thermistor; and
a heating element.

20. The flow rate sensor of claim 19, wherein the heating element is a resistor.

21. The flow rate sensor of claim 19, wherein the heated temperature sensing device further comprises a wire that attaches the thermistor to the heating element.

22. The flow rate sensor of claim 21, wherein the wire forms a probe that extends into the flow channel.

23. The flow rate sensor of claim 5, wherein the flow equalizer is a substantially cylindrical tube that fits within the flow channel and includes a plurality of drilled flow channels.

24. The flow rate sensor of claim 23, wherein the plurality of drilled flow channels in the flow equalizer are of different diameters.

25. The flow rate sensor of claim 23, wherein the flow equalizer is made of Teflon.

26. The flow rate sensor of claim 6, wherein the constrictor is located near the outlet end of the sensor body.

27. The flow rate sensor of claim 6, wherein the constrictor is made of Teflon.

28. The flow rate sensor of claim 6, wherein the constrictor is located within the flow channel and partially obstructs the flow channel.

29. A flow rate sensor comprising:
a sensor body having an inlet end and an outlet end and having a flow channel formed between the inlet and outlet ends through which a liquid can flow;
means for sensing the ambient temperature of the liquid near the inlet end of the sensor body, the means for sensing comprising a temperature sensor coupled to a heat sink, said heat sink being operative to provide good thermal conductivity between said liquid and said ambient temperature sensing device; and
means for sensing the cooling of a heated temperature sensor near the outlet end of the sensor body, wherein the amount of cooling of the heated temperature sensor correlates to a particular flow rate of the liquid passing through the flow channel.

30. A flow rate sensor comprising:
a sensor body having an inlet end and an outlet end and having a flow channel formed between the inlet and outlet ends through which a liquid can flow;
an ambient temperature sensor comprising a thermistor, and a heat sink that extends into the flow channel; and
a heated temperature sensor comprising a thermistor, a resistive heater, and a probe that extends into the flow channel.

31. A flow rate sensor comprising:
a sensor body having an inlet end and an outlet end, and a flow channel formed between the two ends of the body;
an ambient temperature sensor located at least partially within the flow channel at the inlet end of the sensor body;
a heated temperature sensor located at least partially within the flow channel at the outlet end of the sensor body; and
a control circuit coupled to the ambient temperature sensor and the heated temperature sensor for (a) measuring the ambient temperature of a liquid flowing into the inlet end of the sensor body; (b) applying a constant energy to the heated temperature sensor in order to raise the temperature of the heated temperature sensor to a level above the ambient temperature sensor; (c) measuring the temperature of the liquid as it flows through the flow channel by the heated temperature sensor; and (d) calculating the flow rate of the liquid as a function of the difference in temperature between the heated temperature sensor and the ambient temperature sensor.

32. The flow sensor of claim 31, wherein the ambient temperature sensor includes a heat sink at least partially within the flow channel of the sensor body.

33. The flow sensor of claim 31, wherein the flow rate is calculated according to the following equation:

$$v = \frac{K}{\rho}\left(\frac{dQ}{dt}\frac{1}{T_s - T_o}\right)^x, \text{ where}$$

v is the flow rate of the liquid through the flow channel, K is a calibration constant, $\rho$ is the liquid density, dQ/dt represents thermal loss, Ts is the temperature measured at the heated temperature sensor, To is the temperature measured at the ambient temperature sensor, and x is an exponent having a value of between about 1 and 5.

34. The flow sensor of claim 31, wherein the heated temperature sensor includes a temperature sensing device, a heater element in close proximity to the temperature sensing device, and a wire probe coupled to the temperature sensing device, the wire probe extending into the flow channel in order to detect the temperature of the liquid flowing through the channel.

35. A method of determining the flow rate of a liquid through a flow sensor, comprising the steps of:

(a) measuring the ambient temperature of the liquid as it flows into the flow sensor using a first temperature sensor;

(b) applying a constant energy to a second temperature sensor located downstream from the first temperature sensor in order to raise the temperature of the second temperature sensor to a level above the measured ambient temperature of the liquid;

(c) measuring the temperature of the liquid as it flows through the flow sensor using the second temperature sensor; and (d) calculating the flow rate of the liquid as a function of the difference in temperature between the first and second temperature sensors.

* * * * *